(12) United States Patent
DeVlieg et al.

(10) Patent No.: US 8,548,652 B2
(45) Date of Patent: Oct. 1, 2013

(54) SYSTEM FOR REDUCING CARBON BRAKE WEAR

(75) Inventors: Garrett H. DeVlieg, Bellevue, WA (US); John Gowan, Edmonds, WA (US)

(73) Assignee: Hydro-Aire, Inc., subsidiary of Crane Co., Burbank, CA (US)

( * ) Notice: Subject to any disclaimer, the term of this patent is extended or adjusted under 35 U.S.C. 154(b) by 917 days.

(21) Appl. No.: 11/343,539

(22) Filed: Jan. 31, 2006

(65) Prior Publication Data
US 2007/0179686 A1 Aug. 2, 2007

(51) Int. Cl.
*G06F 7/00* (2006.01)
*G06F 17/00* (2006.01)

(52) U.S. Cl.
USPC ............ 701/9; 188/1.11 L; 188/73.1; 702/34; 303/20; 303/126

(58) Field of Classification Search
USPC ............... 701/9, 78; 340/438, 449; 303/126, 303/191, 20; 244/111; 702/33–34; 188/71.5, 188/71.6, 173, 246 AA
See application file for complete search history.

(56) References Cited

U.S. PATENT DOCUMENTS

| | | | | |
|---|---|---|---|---|
| 3,678,486 A | * | 7/1972 | Bickel et al. .................. 374/111 |
| 3,874,618 A | * | 4/1975 | Bates .............................. 244/50 |
| 3,948,569 A | | 4/1976 | Gentet et al. | |
| 4,296,897 A | * | 10/1981 | Thompson .................... 244/111 |
| 4,525,782 A | * | 6/1985 | Wohlfarth et al. .............. 701/99 |
| 4,822,113 A | * | 4/1989 | Amberg et al. ............... 303/191 |
| 4,878,563 A | | 11/1989 | Baden et al. | |
| 4,986,610 A | | 1/1991 | Beck et al. | |
| 5,330,034 A | * | 7/1994 | Rancourt et al. .............. 188/71.6 |
| 5,651,430 A | * | 7/1997 | Rancourt et al. ......... 188/1.11 L |
| 5,803,211 A | * | 9/1998 | Wilke ............................ 188/173 |
| 5,812,053 A | * | 9/1998 | Kovack ......................... 340/449 |
| 5,845,975 A | | 12/1998 | Wells | |
| 5,848,672 A | * | 12/1998 | Brearley et al. .......... 188/1.11 L |
| 5,906,253 A | * | 5/1999 | Rancourt et al. ....... 188/264 AA |

(Continued)

FOREIGN PATENT DOCUMENTS

EP    1326813 B1 *  7/2003
FI    200605295 A  * 11/2007

(Continued)

OTHER PUBLICATIONS

Antiskid control for aircraft via extremum-seeking; Tunay, I.; American Control Conference, 2001. Proceedings of the 2001 vol. 2, Jun. 25-27, 2001 pp. 665-670 vol. 2; Digital Object Identifier 10.1109/ACC.2001.945790.*

(Continued)

*Primary Examiner* — Cuong H Nguyen
(74) *Attorney, Agent, or Firm* — Fulwider Patton LLP

(57) ABSTRACT

A brake monitoring system is described for use on aircraft having carbon brakes. The system displays the number of times the brakes have been applied in a preselected counting interval such as during each takeoff and landing cycle. By raising the pilot's awareness of the number of times the brakes have been applied, a more efficient brake use is encouraged in view of the knowledge that carbon brake wear is substantially a function of the number of applications rather than the total energy that is converted thereby. Additionally, the monitoring system provides an indication of the temperature of the brakes which encourages the pilot to maintain a minimum temperature therein beyond which wear is reduced.

13 Claims, 2 Drawing Sheets

(56) References Cited

U.S. PATENT DOCUMENTS

| | | | |
|---|---|---|---|
| 6,006,869 A * | 12/1999 | Rancourt et al. | 188/71.5 |
| 6,257,681 B1 * | 7/2001 | Bartram | 303/126 |
| 6,340,075 B1 | 1/2002 | Bok et al. | |
| 6,398,162 B1 | 6/2002 | Stimson et al. | |
| 6,478,252 B1 * | 11/2002 | Stimson et al. | 244/111 |
| 6,604,708 B1 | 8/2003 | DeVlieg | |
| 6,850,867 B2 * | 2/2005 | Haas et al. | 702/182 |
| 6,929,333 B2 * | 8/2005 | DeVlieg | 303/20 |
| 7,086,503 B2 | 8/2006 | Miller et al. | |
| 7,164,117 B2 * | 1/2007 | Breed et al. | 250/221 |
| 7,441,844 B2 * | 10/2008 | DeVlieg et al. | 303/126 |
| 7,708,223 B2 * | 5/2010 | Mathieu | 244/50 |
| 2005/0046584 A1 * | 3/2005 | Breed | 340/825.72 |
| 2005/0060083 A1 * | 3/2005 | Ali | 701/93 |
| 2006/0208169 A1 * | 9/2006 | Breed et al. | 250/221 |
| 2009/0065636 A1 * | 3/2009 | Mathieu | 244/87 |

FOREIGN PATENT DOCUMENTS

| | | | |
|---|---|---|---|
| GB | 2291844 A * | 2/1996 | |
| JP | 2003212099 | 7/2003 | |
| WO | 9623673 A1 | 8/1996 | |
| WO | 9700388 A1 | 1/1997 | |
| WO | WO 0228801 A2 * | 4/2002 | |
| WO | WO 2007128878 A1 * | 11/2007 | |
| WO | WO 2008054440 A2 * | 5/2008 | |
| WO | WO 2008060684 A2 * | 5/2008 | |

OTHER PUBLICATIONS

Compensation for Heeling Error of MEMS Accelerator Sensor in Vehicle ABS; Kebao Xu; Juncheng Wang; Xiaojun Ju; Ping Zhu; Guangqing Chen; Mechatronic and Embedded Systems and Applications, Proceedings of the 2nd IEEE/ASME International Conference on; Aug. 2006 pp. 1-5 ; Digital Object Identifier 10.1109/MESA.2006.297008.*

Modeling and robust control design for aircraft brake hydraulics; Tunay, I.; Rodin, E.Y.; Beck, A.A.; Control Systems Technology, IEEE Transactions on; vol. 9, Issue 2, Mar. 2001 pp. 319-329; Digital Object Identifier 10.1109/87.911383.*

The future of head-up guidance; Hartman, B.K.; Aerospace and Electronic Systems Magazine, IEEE; vol. 8, Issue 3, Mar. 1993 pp. 31-33; Digital Object Identifier 10.1109/62.199818.*

Head-up guidance systems: the foundation of situation awareness systems; Hartman, B.K.; Moylan, P.; Digital Avionics Systems Conference, 1994. 13th DASC., AIAA/IEEE; Oct. 30-Nov. 3, 1994 pp. 88-92; Digital Object Identifier 10.1109/DASC.1994.369498.*

Dynamic density: measuring and predicting sector complexity [ATC]; Kopardekar, P. et al.; Digital Avionics Systems Conference, 2002. Proceedings. The $21^{st}$ vol. 1, Digital Object Identifier: 10.1109/DASC.2002.1067920; Publication Year: 2002 , pp. 2C4-1-2C4-9 vol. 1.*

Neural networks for novelty detection in airframe strain data; Hickinbotham, S.J. et al.; Neural Networks, 2000. IJCNN 2000, Proceedings of the IEEE-INNS-ENNS International Joint Conference on; vol. 6; Digital Object Identifier: 10.1109/IJCNN.2000. 859424; Publication Year: 2000 , pp. 375-380 vol. 6.*

Remaining engine life estimation for a sensor-based aircraft engine; Ten-Huei Guo et al.; Systems, Man and Cybernetics, 2005 IEEE International Conference on; vol. 1; Digital Object Identifier: 10.1109/ICSMC.2005.1571177; Publication Year: 2005 , pp. 387-392 vol. 1.*

In-line oil debris monitor for aircraft engine condition assessment; Miller, J.L. et al..;Aerospace Conference Proceedings, 2000 IEEE; vol. 6; Digital Object Identifier: 10.1109/AERO.2000.877882; Publication Year: 2000 , pp. 49-56 vol. 6.*

Research on Simulation of Aircraft Electro-Hydrostatic Actuator Anti-Skid Braking System; Liang Bo; Li Yuren; Zhang Zhihui Measuring Technology and Mechatronics Automation (ICMTMA), 2011 Third International Conference on; vol. 3 Digital Object Identifier: 10.1109/ICMTMA.2011.591; Publication Year: 2011 , pp. 78-82.*

Antiskid control for aircraft via extremum-seeking; Tunay, I.; American Control Conference, 2001. Proceedings of the 2001 vol. 2; Digital Object Identifier: 10.1109/ACC.2001.945790; Publication Year: 2001 , pp. 665-670 vol. 2.*

Modeling and robust control design for aircraft brake hydraulics; Tunay, I. ; Rodin, Ervin Y. ; Beck, A.A.; Control Systems Technology, IEEE Transactions on; vol. 9 , Issue: 2; Digital Object Identifier: 10.1109/87.911383 Publication Year: 2001 , pp. 319-329.*

* cited by examiner

SYSTEM FOR REDUCING CARBON BRAKE WEAR

FIELD OF THE INVENTION

The present invention generally relates to aircraft braking systems and more particularly pertains to efforts to reduce carbon brake wear.

BACKGROUND OF THE INVENTION

Carbon brakes as are fitted to many modem aircraft that are designed to carry large passenger or cargo payloads. Such brakes rely on the use of a carbon composite material to serve as friction material as well a heat sink. A stack of carbon rotor disks and carbon stator disks are coaxially arranged in an alternating sequence along a wheel's axis wherein the rotor disks are rotationally keyed to the wheel while the stator disks are keyed to the stationary axle. Braking force is generated by the pressurization of piston actuators that are configured to compress the stack between a pressure plate and a backing plate to thereby cause the friction surfaces of adjacent disks to engage one another. While carbon brakes are preferred for weight and performance reasons over steel brakes, the cost of replacing the stack as a function of landing cycles between replacements is much higher than for steel brakes.

In contrast to conventional steel brakes for which brake life is largely determined by the total amount of energy that is absorbed, carbon brakes wear as a function of the number of times the brakes are applied as wear is highest upon initial application when the brake temperature is low. Consequently, most wear tends to occur during taxiing as the brakes may routinely be applied dozens of times in negotiating the taxiways between the runway and the gate and during the stop-and-go that may be encountered in the queue for take off.

Efforts to reduce the number of brake applications and hence the wear rate of carbon brakes have to date focused on disabling one or more brakes during low energy brake applications. As such, individual brakes are subject to a lower number of brake applications while the increased braking load during each application has no adverse effect on wear. Systems have been described that determine the sequence of brake disablements so as to achieve an even wear rate amongst the various braked wheels without compromising stopping ability and without adversely affecting the stability of the aircraft. Such systems add substantial complexity and cost to an aircraft braking system and retrofitting existing aircraft requires the expenditure of a significant amount of time and effort.

An alternative approach for reducing carbon brake wear and more specifically, for reducing the number of brake applications during a take-off and landing cycle is needed that is inexpensive and simple and is easily adapted to existing aircraft. Ideally, such system should be adaptable to any aircraft and without modification of the existing brake system.

SUMMARY OF THE INVENTION

The present invention provides a relatively simple solution for reducing carbon brake wear. Rather than interfering with an existing brake control system, the device merely promotes a more wear-efficient use of the brakes by the pilot. By monitoring and displaying the number of times the brakes have been applied and their temperature, the pilot is encouraged to apply the brakes less often and/or maintain a preselected amount of heat in the brakes.

The device of the present invention comprises a counter that keeps the pilot apprised of how often the brakes have been applied and additionally provides an indication of the temperature of the aircraft's brakes. By providing immediate feedback to the pilot, the pilot will tend to apply the brakes less often and do more braking during individual brake applications. The temperature indicator will encourage the pilot to maintain heat in the brakes.

Each brake application is sensed by a switch that physically engages the brake pedal mechanism so as to be triggered by any movement thereof or by a pressure transducer in the hydraulic system. Each application is counted and the total count is displayed to the pilot on the flight deck. The system may be configured to reset after each flight and may include the ability to retain the overall brake application count for retrieval at a later time such as at preselected time intervals or during a maintenance operation. Additionally, the temperature of the brakes may be sensed and displayed either as a direct readout of their temperature or by a change in the color of the count readout when a threshold temperature is achieved.

These and other advantages of the present invention will become apparent from the following detailed description of preferred embodiments which, taken in conjunction with the drawings, illustrate by way of example the principles of the invention.

DETAILED DESCRIPTION OF THE PREFERRED EMBODIMENTS

The present invention serves to promote a more wear-efficient use of an aircraft's carbon brakes to the extent it keeps the pilot apprised of how many times the brakes have been applied as well as of their temperature. Knowing that carbon brake wear is substantially a function of the number of times the brakes are applied, a pilot will be more inclined to reduce the number of brake applications while braking harder during each use if he is aware of the brake application count in real time. Additionally, knowledge of the brake temperature will encourage the pilot to maintain heat in the brakes and to thereby reduce the number of applications when the brakes are below a threshold temperature.

Figure 1:
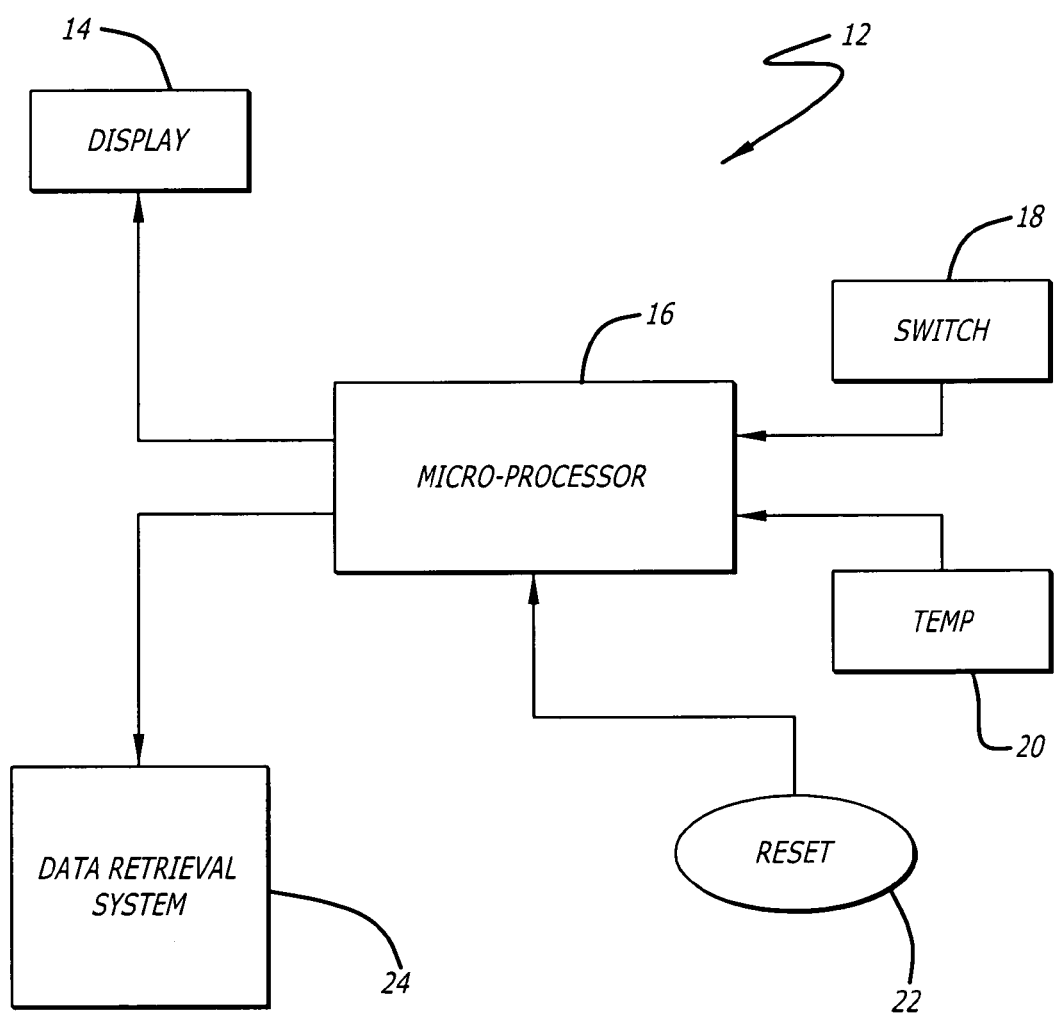
FIG. 1 is a schematic illustration of a preferred embodiment of the brake monitoring system of the present invention.

FIG. 1 is a schematic illustration of a preferred embodiment of the present invention. The system 12 includes a display component 14 that is positioned on the flight deck. The display receives information from a microprocessor 16 that in turn receives signals from a switch mechanism 18 and optionally, temperature sensors 20.

The switch mechanism may take the form of a microswitch that is configured to engage the aircraft's brake pedal so as to close a circuit and thereby send a signal whenever the pedal is depressed. Alternatively, the switch may take the form of a pressure transducer that is configured to close a circuit and thereby send a signal whenever an elevated pressure within the brake system's hydraulic actuation system is detected.

The temperature sensors 20 are positioned to measure the temperature of the brakes and preferably of each of an aircraft's brakes individually. Such temperature sensors may take the form of for example thermocouples or infrared sensors.

The microprocessor 16 serves the function of counting signals received from the switch mechanism 18 and of generating a signal representative of such count for transmission to the display component. The count is tallied until a reset function 22 is activated such as for example by engine start-up or with the hookup of external power in order to limit the count to each take-off and landing cycle. The microprocessor may also be called upon to modify the count such as for example in the event the aircraft's braking system includes a taxi brake select feature that selectively releases some but not all of the brakes. The count would be reduced by one half to one third depending upon the number of wheels on each main landing gear in order to more accurately reflect the number of times each brake has been applied. The count is additionally accessible to a Data Retrieval System 24 which can be configured to store a count history for later review and interpretation. The microprocessor 16 can be integrated in or communicate with the aircraft's brake control unit or a central aircraft communication system.

The microprocessor may additionally be configured to receive and interpret the signals received from the temperature sensors 20. Such signal may be converted into degrees Centigrade or Fahrenheit for transmission to the display component 14. Moreover, the incoming temperature signals may be processed in order to provide a separate readout for each brake, for an average of all of the brakes or for the coolest brake. Alternatively, the brake count and temperature information may be integrated such that when the temperature exceeds a threshold temperature, the displayed brake count changes color. In a preferred embodiment, the brake count would be displayed in red when the temperature is below 350° F. and in green when the brake temperature exceeds 350° F.

Figure 2:
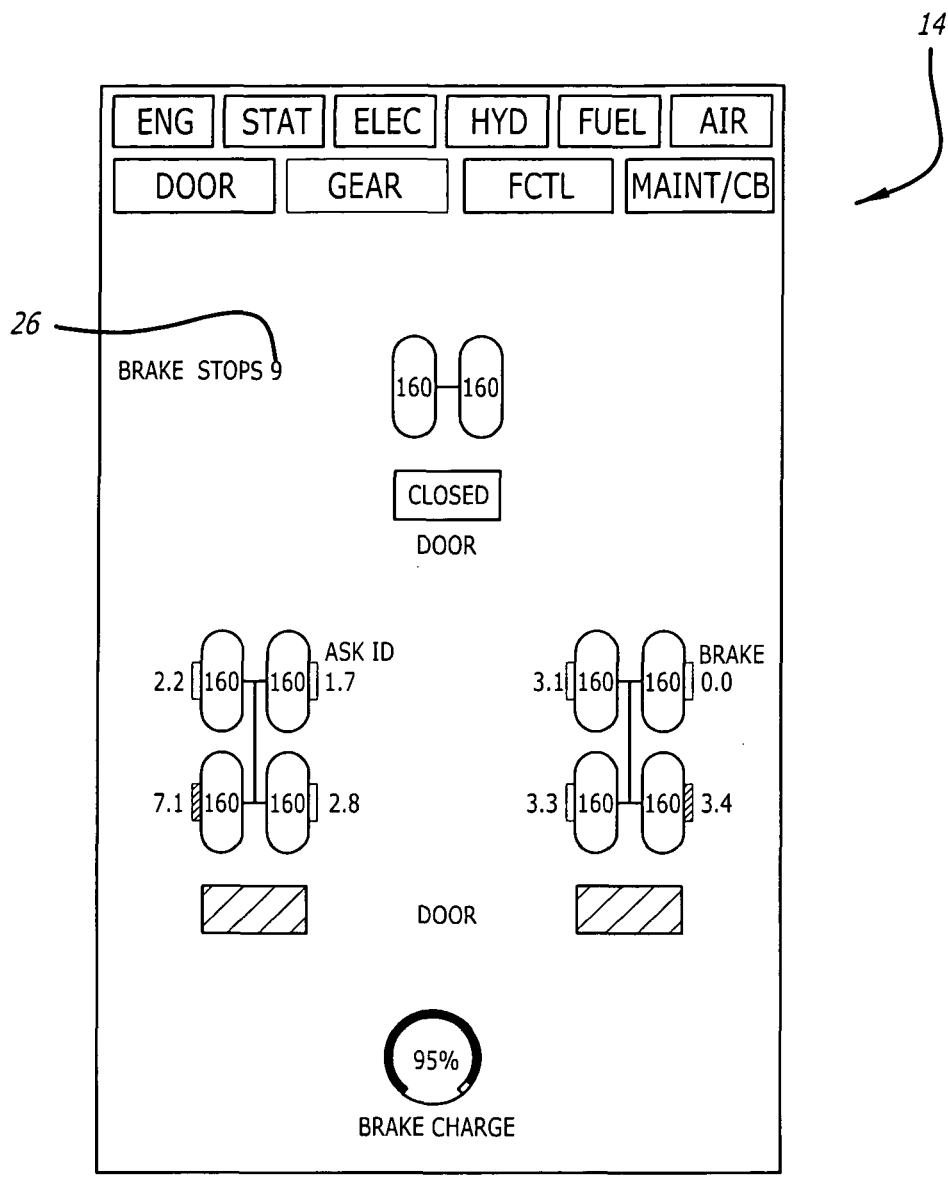
FIG. 2 is an illustration of a preferred embodiment of the display component of the present invention.

FIG. 2 is a preferred embodiment of the manner in which the information is displayed by the display component 14 of the brake monitoring system of the present invention. Such display may be integrated in the flight deck displays that are controlled by the aircraft's centralized display system. In addition to displaying various other brake-related data, the display includes a readout 26 of the number of times the brakes have been applied. Such readout is preferably displayed in red if the temperature is below a pre-established threshold temperature and green if the temperature is above such pre-established threshold temperature.

In use, the brake monitoring system serves to keep the pilot apprised of the number of times the brakes have been applied during a take-off and landing cycle and of the temperature of the brakes. Being aware of the wear characteristics of carbon brakes, to the extent that wear is accelerated at low temperatures and with the frequency rather than intensity of applications, and being cognizant of the number of times the brakes have been applied and of their temperature in real time encourages a pilot to use the brakes in a more wear-efficient manner. The pilot would thereby be encouraged to use the brakes less often and with more intensity during taxing and to either maintain more heat in the brakes and or avoid use while their temperature is below the low brake wear threshold temperature.

While particular forms of this invention have been described and illustrated, it will be apparent to those skilled in the art that various modifications can be made without departing from the spirit and scope of the invention. Accordingly, it is not intended that the invention be limited except by the appended claims.

What is claimed is:

1. A system for enabling a pilot to reduce brake wear on aircraft fitted with a plurality of carbon brakes, comprising:
   a switch mechanism for sensing application of said plurality of carbon brakes and for generating a brake application count signal indicating application of said plurality of carbon brakes:
   a microprocessor operative to receive said brake application count signal and to tally a cumulative brake application count of the number of times the brakes have been applied during a preselected interval responsive to said count signal, said microprocessor being operative to reduce the cumulative brake application count by one third to one half to generate an adjusted brake application count in the event that the aircraft braking system includes a taxi brake select feature that selectively releases some but not all of said plurality of carbon brakes;
   a data retrieval system configured to store said adjusted brake application count; and
   a monitor displaying to a pilot in real time a count display of the adjusted brake application count and an indication of a temperature of said brakes, indicating to the pilot to use the brakes less often and with more intensity during taxiing, and to maintain more heat in the brakes while the temperature of said brakes is below a threshold temperature.

2. The system of claim 1, wherein said adjusted brake application count is stored in said data retrieval system and is available for later download.

3. The system of claim 1, wherein said count display changes color when a certain threshold temperature is achieved.

4. The system of claim 3, wherein such threshold temperature is about 350° F.

5. The system of claim 1, wherein said aircraft has a plurality of brakes and said indication of temperature is based on an average temperature of all of said aircraft's brakes.

6. The system of claim 1, wherein said aircraft has a plurality of brakes and said indication of temperature is based on the temperature of the coolest of said aircraft's brakes.

7. The system of claim 1, wherein each brake application is sensed mechanically.

8. The system of claim 1, wherein said switch mechanism comprises a microswitch configured to increment said brake application count signal by movement of a brake pedal that is used to actuate the brakes.

9. The system of claim 1, wherein each brake application count is triggered hydraulically.

10. The system of claim 9, wherein a pressure switch is tripped by pressure in a hydraulic system that actuates the brakes.

11. The system of claim 1, wherein said interval comprises one take-off and landing cycle.

12. The system of claim 11, wherein said count resets automatically by engine start.

13. The system of claim 11, wherein said count resets automatically when the aircraft is hooked up to an external power source.

* * * * *